United States Patent [19]

Ainoura

[11] 4,174,914
[45] Nov. 20, 1979

[54] SPHERICAL HOB FOR GENERATING GEARS

[76] Inventor: Masato Ainoura, 1253 Eguchi, Kita-Shigeyasu-cho, Miyaki-gun, Saga-ken, Japan

[21] Appl. No.: 916,689

[22] Filed: Jun. 19, 1978

[30] Foreign Application Priority Data

Jun. 22, 1977 [JP] Japan .................................. 52-74142

[51] Int. Cl.² .............................................. B26D 1/12
[52] U.S. Cl. ...................................................... 407/26
[58] Field of Search .................................... 407/23, 26

[56] References Cited

U.S. PATENT DOCUMENTS

| | | | |
|---|---|---|---|
| 1,086,542 | 2/1914 | Lees | 407/26 |
| 2,615,359 | 10/1952 | Cook et al. | 407/23 |
| 3,145,621 | 8/1964 | Ransom | 407/23 |

Primary Examiner—Harrison L. Hinson
Attorney, Agent, or Firm—C. Bruce Hamburg

[57] ABSTRACT

A spherical hob for generation of a gear comprises a symmetrical frustospherical body in the form of a sphere truncated at two opposed extremities thereof, the body having an axis of symmetry perpendicular to the extremities. A hole passes through the body coaxially with the axis. Formed spirally about the axis on the peripheral surface of the body are projections having a section in a plane including the axis in the form of an involute tooth profile. Formed on the peripheral surface of the body, across the projections is a plurality of equidistantly arranged spaces dividing the projections into a plurality of spirally continuous hob blades, each having an involute tooth profile. Reliefs are formed on the side faces and the peripheral face of the hob blades so that as the blade faces of the hob blades are cut and sharpened, the tooth profile of an imaginary gear generated by rotation of the hob about the axis is gradually displaced to attain an addendum to the tooth profile, whereby after cutting and sharpening of the hob blade faces after said faces have become dull from use in cutting gears in gear blanks, shifting of the hob toward a new gear blank by a distance corresponding to the magnitude of undercut of the peripheral relief results in cutting in the new gear blank of a gear generated in gear blanks before cutting and sharpening of the blade faces.

2 Claims, 13 Drawing Figures ent invention relates to a spherical hob for generation of an involute gear.

SPHERICAL HOB FOR GENERATING GEARS

BACKGROUND OF THE INVENTION

The present invention relates to a spherical hob for generation of an involute gear.

A cylindrical hob is commonly used for cutting involute, and other, gears. However, a cylindrical hob can be used only for cutting external gears, not internal gears. Internal gears are generally cut by means of a gear cutter having a pinion type cutter. In a very few cases, internal gears are cut by means of a single position hob and single point tool. Gear cutting by means of a pinion type cutter is inferior to hobbing in cutting efficiency and cutting precision. When gears are cut by means of a single position hob or single point tool, cutting precision is not good and the life of the tools is shorter than the life of a cylindrical hob.

It has been found that the disadvantages of the prior art can be overcome by providing a spherical hob for cutting an involute gear. In specific embodiments herein illustrated, the hob is frustospherical, being equally truncated at opposite ends of its axis of rotation due to provision of a bore to receive a shaft the axis of which constitutes the axis of rotation. Since the hob is, nevertheless, in principle, spherical, the term "spherical hob" as employed herein is intended to encompass such frustoconical configurations.

It is a primary object of the present invention to provide a spherical hob for cutting an involute gear.

Other objects and features of the present invention will be apparent from the following embodiments and claims, and many advantages not specifically mentioned herein will also be apparent to those skilled in the art when the present invention is practiced.

SUMMARY OF THE INVENTION

According to the invention, there is provided a spherical hob, for generation of a gear, which comprises a frustospherical body in the form of a sphere equally truncated at two exposed extremities thereof, the body having an axis of symmetry perpendicular to the extremities. A hole passes through the body coaxially with the axis. Formed spirally about the axis on the peripheral surface of the body are projections having a section in a plane including the axis in the form of an involute tooth profile. Formed on the peripheral surface of the body across the projections is a plurality of equidistantly arranged spaces dividing the projections into a plurality of spirally continuous hob blades, each having an involute tooth profile. Reliefs are formed on the side faces and the peripheral face of the hob blades so that as the blade faces of the hob blades are cut and sharpened the tooth profile of an imaginary gear generated by rotation of the hob about the axis is gradually displaced to attain an addendum to the tooth profile, whereby after cutting and sharpening of the hob blade faces after said faces have become dull from use in cutting gears in gear blanks, shifting of the hob toward a new gear blank by a distance corresponding to the magnitude of undercut of the peripheral relief results in cutting in the new gear blank of a gear generated in gear blanks before cutting and sharpening of the blade faces.

A method and apparatus for manufacturing the spherical hob is disclosed in my copending application Ser. No. filed simultaneously herewith, entitled "Method and Apparatus for Preparation of Spherical Hob for Generation of Gear," the disclosure of which is hereby incorporated herein by reference.

The configuration of the spherical hob of the invention is such that rotation of the spherical hob about its axis of symmetry (hereafter "axis of rotation" or simply "axis") is equivalent to performing the rotation of a virtual involute gear at the plane including the axis or a plane at fixed angle by rotating the hob on its axis passing the center of the hob.

DETAILED DESCRIPTION OF PREFERRED EMBODIMENTS

Figure 1A:
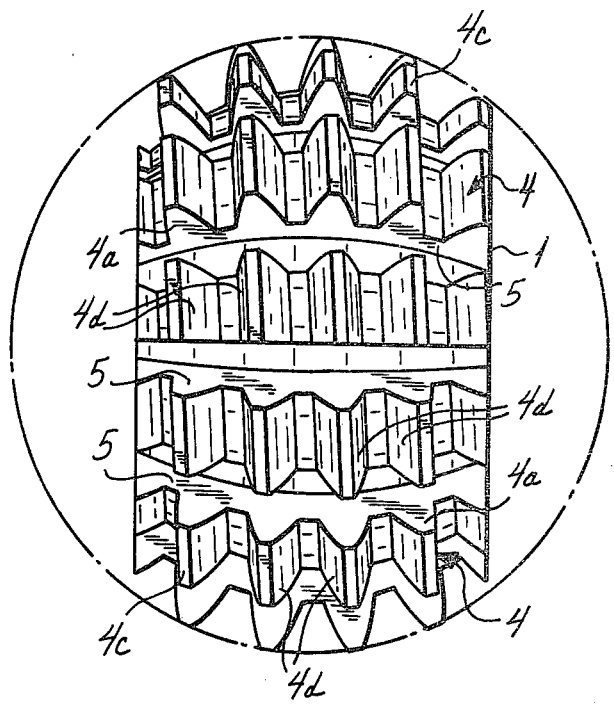
FIG. 1(a) is a front view of a spherical hob.
Figure 1B:
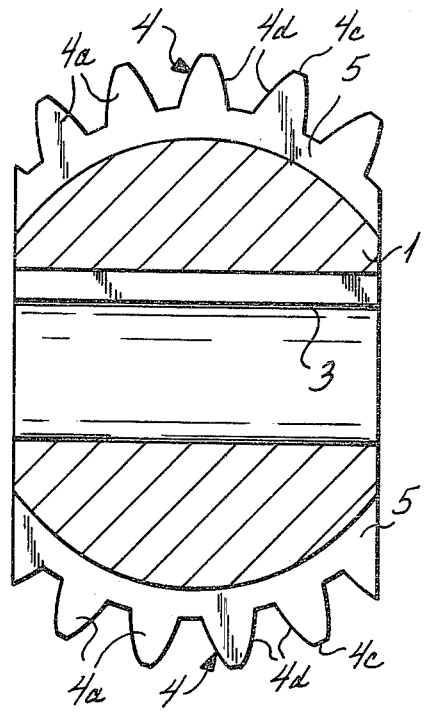
FIG. 1(b) is a sectional view of the spherical hob shown in FIG. 1(a)
Figure 3A:
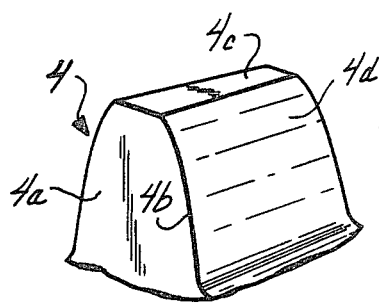
FIG. 3(a), 3(b) and 3(c) are perspective, side and plan views of the hob blade.
Figure 3B:
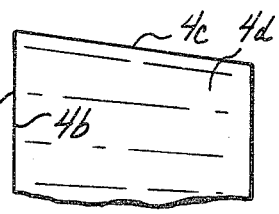
Figure 3C:
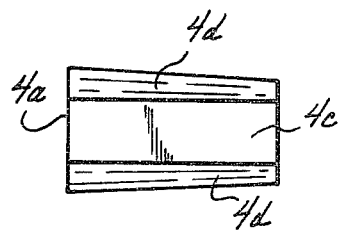
Figure 7:
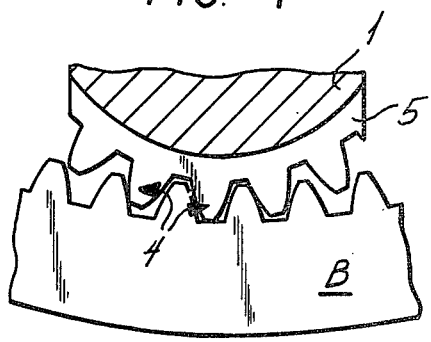
FIG. 7 is a partially sectional view illustrating the generation of an internal gear by cutting by the spherical hob.
Figure 9:
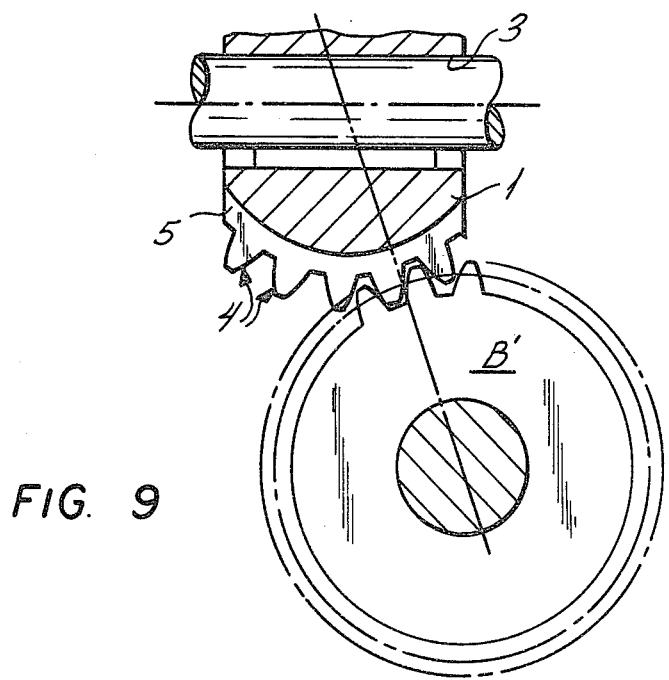
FIG. 9 is a partially sectional view illustrating the cutting of a spur gear by a spherical hob according to the invention.

Shown in FIGS. 1(a) and 1(b) is a spherical hob 1 in which hob blades 4 are continuously and spirally arranged on the spherical surface. (The reference number "1" will be used herein both for the hob and the blank, in various stages of machining, from which the hob is machined.) When the spherical body of the hob 1, through which is machined a hole 3, including a key groove, for a shaft having a key formed thereon, is rotated about its axis, it is as if an imaginary involute gear were rotated about the axis through any plane including the axis. The hob 1 is so rotated to cut a gear, the blades 4 cutting involute internal gear teeth in a blank B (FIG. 7). As the cutting proceeds, the blades 4, in effect, constitute involute gear teeth engaging conjugate involute gear teeth formed in the blank B. The blank B is thus machined into an internal gear, which has been impossible by means of a cylindrical hob. Further, by use of the spherical hob 1, there is attained an advantage in the cutting of external gears, too, namely that a radial axis of the blank B' intersecting the center of the hob 1 need not be perpendicular to the axis of rotation L of the hob 1, as shown in FIG. 9, which is indispensable in the cylindrical hob. Moreover, registering of the axis of the hob and the axis of the blank, which is indispensable in the use of a single position hob for internal gears, can be omitted. However, in the spherical hob 1, since rotation of an imaginary gear is effected by the rotation of the hob 1, if reliefs of the same type or in the same direction are formed on both the tooth crest 4c and side faces 4d of the hob blade 4, when the blade face 4a, the edges of which are cutting edges 4b, (FIGS. 3(a), (b), (c)) is cut for sharpening if it is worn, the outside diameter of hob 1 is diminished by the cutting and a tooth profile equal to the tooth profile before cutting cannot be generated.

Figure 2:
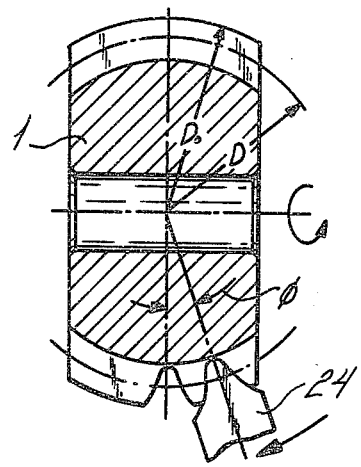
FIG. 2 is a diagrammatic, partially sectional view of the spherical hob and the machining thereof for the purpose of explaining the determination of the outside diameter and pitch thereof.

Supposing that the tooth number of the imaginary gear is Z, as shown in FIG. 2, the angle $\phi$ of the rotation corresponding to one tooth is expressed as follows:

$$\phi = (2\pi/Z) \text{rad}$$

Thus, the rotation speed of a swivel table (not illustrated), to which a cutting tool 24 is operatively connected, is adjusted by a tooth number indexing mechanism (not illustrated) so that the above relation is established. Accordingly, the rotation of a so cut hob blank 1 about the axis thereof effects the rotation of the imaginary gear having the tooth number Z.

The outside diameter of the hob satisfies the following relation: $D_o = m \cdot Z + 2.5 \cdot m + b$, wherein $D_o$ stands for the outside diameter of the hob, m designates the module of the imaginary gear, A designates the number of teeth of the imaginary gear and b stands for the amount of increase of the diameter. The module m is the quotient obtained by dividing the diameter of the pitch circle of the hob by Z. The pitch diameter of the hob is designated D in FIG. 2.

While the hob blank 1 makes one rotation, the tool 24 rotates by $2\pi/Z$ rad as pointed out hereinbefore. Supposing that $2\pi/Z$ rad is expressed as $\alpha$ and the number of the blade spaces 5 is N, if the cam rotates $(N - \alpha/2\pi)$ revolutions for every revolution of rotation of the hob blank 1, the crest faces 4c of all the hob blades 1 can be generated by cutting. Accordingly, the indexing ratio $\eta_1$ is expressed as follows:

$$\eta_1 = F(N - \alpha/2\pi)$$

F is a machine constant. Since $\alpha$ is equal to $2\pi/Z$, the indexing ratio $\eta_1$ can be expressed as follows:

$$\eta_1 = F(N - \frac{2\pi/Z}{2\pi})$$
$$= FN(1 - \frac{1}{NZ})$$

Accordingly, if adjustment is made by a relief indexing mechanism (not illustrated) so that the indexing ratio for one rotation of the hob blank is equal to $FN(1-1/NZ)$, the peripheral relief forming operation can be precisely made on the respective hob blades being rotated.

Figure 4A:
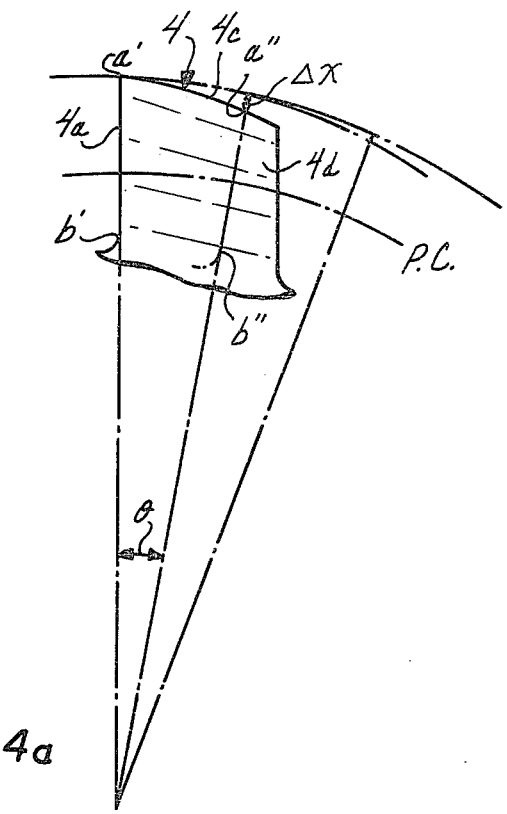
FIG. 4(a) is a side diagram illustrating the relation between the amount of the undercut of the peripheral relief and the undercut angle.
Figure 4B:
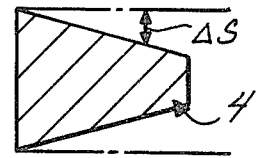
FIG. 4(b) is an axial sectional view of a hob blade.
Figure 5:
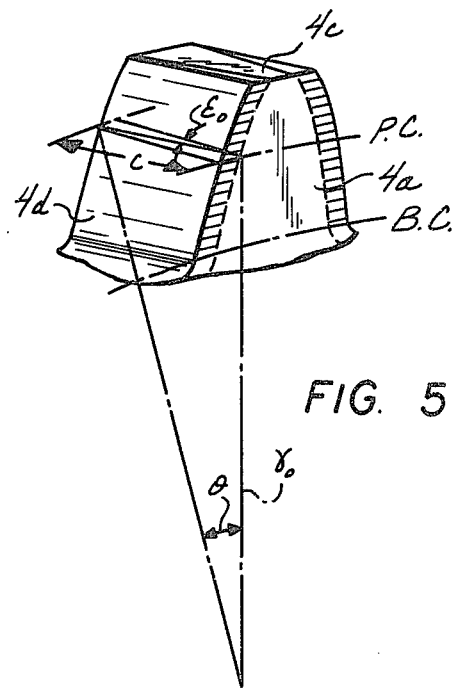
FIG. 5 is a perspective diagram illustrating the relation between the amount of addendum of the side relief and the addendum angle.

The angle $\zeta$ of this peripheral relief is calculated from the following formula, as seen from FIG. 4(a):

$$\tan \zeta = \frac{h}{\frac{\pi D_0}{N}} = \frac{Nh}{\pi D_0}$$

wherein h designates the distance of radial reciprocation of the tool relative to the hob blank 1 and $D_o$ stands for the outer diameter of the hob blank 1.

The amount of the undercut of the peripheral relief or quantity of addendum with respect to the central angle $\theta$ of the hob blank 1 is calculated according to the following formula, as shown in FIG. 4(a):

$$\Delta x = \frac{\frac{\pi D \cdot \theta \cdot h}{360}}{\frac{\pi D}{N}} = \frac{N \cdot \theta \cdot h}{360}$$

More specifically, when the quantity of addendum is $\Delta x$, the amount of the change of the tooth thickness on the pitch circle P.C. of the involute tooth profile is expressed as follows:

$$2 \cdot \Delta x \cdot \tan \alpha$$

supposing that the module is m and the pressure angle is $\alpha$. Accordingly, if the circular tooth thickness on the pitch circle P.C. is reduced by $2 \cdot \Delta x \cdot \tan \alpha$, an involute tooth profile can be obtained.

The angle $\epsilon_0$ necessary for reduction of said thickness by $2 \cdot \Delta x \cdot \tan \alpha$ is expressed as follows, as seen from 4(b) and 5:

$$\epsilon_0 = \tan^{-1} \frac{S/2}{G} = \frac{\Delta \times \tan \alpha}{\gamma_0 \theta}$$

wherein $\Delta S$ stands for $2 \cdot \Delta x \tan \alpha$, $\theta$ designates the central angle of the hob blank 1 necessary for addendum of $\Delta x$, G stands for the length along the lead of the hob blade 1 relative to the central angle $\theta$ and $\gamma_0$ designates the diameter of the pitch circle.

Figure 6:
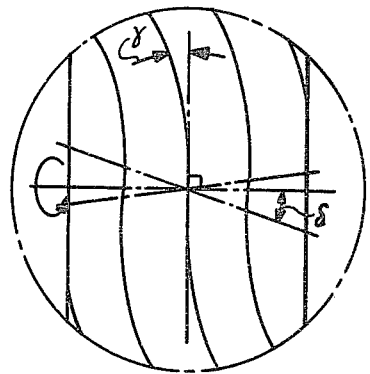
FIG. 6 is a diagram for the purpose of explaining the direction of the flutes.

FIG. 6 illustrates the angle $\delta$ of the flutes 5 between the spiral rows of hob teeth 4 relative to the axis of rotation of the hob and the angle $\zeta$ of the rows of hob teeth 4 relative to a line normal to the axis for a spherical hob designed to generate a helical gear.

Figure 8:
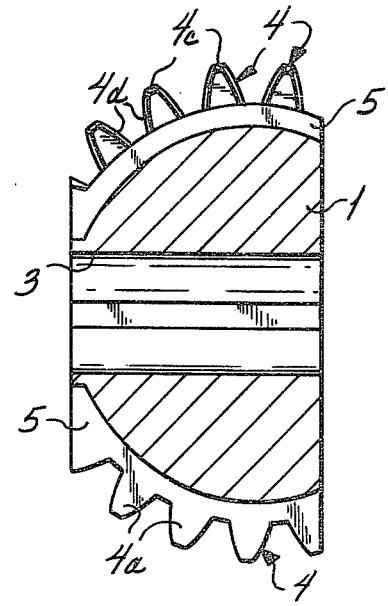
FIG. 8 is a sectional view of another spherical hob according to the invention.

In the case of a spherical hob, as illustrated in FIG. 8, for generating a helical gear, the opposite side of rough cutting edges must be eliminated.

What I claim is:

1. A spherical hob for generation of a gear, which comprises a frustospherical body in the form of a sphere truncated at two opposed extremities thereof, the body having an axis of symmetry perpendicular to said extremities, a hole passing through said body coaxially with said axis, formed spirally about said axis on the peripheral surface of the body projections having a section in a plane including said axis in the form of an involute tooth profile, formed on the peripheral surface of the body, across said projections a plurality of equidistantly arranged spaces dividing said projections into a plurality of spirally continuous hob blades, each having an involute tooth profile, and reliefs formed on the side faces and peripheral face of the hob blades so that as the blade faces of the hob blades are cut and sharpened, the tooth profile of an imaginary gear generated by rotation of the hob about said axis is gradually displaced to attain an addendum to the tooth profile, whereby after cutting and sharpening of the hob blade faces after said faces have become dull from use in cutting gears in gear glanks, shifting of the hob toward a new gear blank by a distance corresponding to the magnitude of undercut of the peripheral relief results in cutting in the new gear blank of a gear generated in gear blanks before cutting and sharpening of the blade faces.

2. A spherical hob according to claim 1, in which the frustospherical body is equally truncated at said two opposed extremities thereof.

* * * * *